United States Patent
Honda et al.

[19]

[11] Patent Number: 6,047,905
[45] Date of Patent: Apr. 11, 2000

[54] FUEL INJECTION VALVE

[75] Inventors: Kiyonari Honda, Ichinomiya; Yutaka Niwa, Nagoya, both of Japan

[73] Assignee: Denso Corporation, Kariya, Japan

[21] Appl. No.: 08/994,049

[22] Filed: Dec. 19, 1997

[30] Foreign Application Priority Data

Dec. 20, 1996 [JP] Japan ................................. 8-340874

[51] Int. Cl.[7] ............................................... F02M 59/00
[52] U.S. Cl. ................................. 239/533.2; 239/533.12; 123/298
[58] Field of Search ..................... 239/533.12, 533.3, 239/533.4, 533.2; 123/298, 445

[56] References Cited

U.S. PATENT DOCUMENTS

| | | | |
|---|---|---|---|
| 5,016,820 | 5/1991 | Gaskell | 239/533.12 |
| 5,058,549 | 10/1991 | Hashimoto et al. | 239/533.12 |
| 5,163,621 | 11/1992 | Kato et al. | 239/533.3 |
| 5,449,121 | 9/1995 | El-Darazi et al. | 239/533.3 |

FOREIGN PATENT DOCUMENTS

| | | |
|---|---|---|
| 7-119584 | 5/1995 | Japan . |
| 8-296531 | 11/1996 | Japan . |

Primary Examiner—Andres Kashnikow
Assistant Examiner—Dinh Q. Nguyen
Attorney, Agent, or Firm—Pillsbury Madison & Sutro LLP

[57] ABSTRACT

The present invention aims to improve evenness of atomizing of fuel in a fuel injection valve. An inner bottom surface of a fuel injection chamber 16 opened or closed by a needle valve 12 is designed in semi-spherical shape, and an injection nozzle 17 is formed obliquely on its bottom surface. To reduce deviation of flow velocity distribution in axial direction of said injection nozzle 17 of the fuel entering said injection nozzle 17, position of the injection nozzle 17 is deviated to a direction rotated by 90° from tilting direction of the injection nozzle 17 toward swirling direction of the fuel with respect to the center of the bottom surface of the fuel injection chamber 16. This is because, in case the injection nozzle 17 is provided at the center of the bottom surface of the fuel injection chamber 16, axial flow velocity reaches minimum at 90° and reaches maximum at 270°. The deviation of the injection nozzle 17 is set in such range that no step is generated on a connection between inner peripheral surface of the fuel injection chamber and inlet of the injection nozzle 17. Further, total periphery of the inlet of the injection nozzle 17 is designed in R-shape (arcuate curved surface), and inner peripheral surface of the fuel injection chamber 16 is connected with the inlet of the injection nozzle 17 as a continuous smooth curved surface.

4 Claims, 9 Drawing Sheets

- 12 NEEDLE VALVE
- 11 VALVE BODY
- 16 FUEL INJECTION CHAMBER
- 17 INJECTION NOZZLE

CENTER OF FUEL INJECTION CHAMBER

CENTER OF INJECTION NOZZLE

SECTIONAL VIEW ALONG THE LINE A-A

CENTER OF FUEL INJECTION CHAMBER

CENTER OF INJECTION NOZZLE $\overline{AB} > \overline{A'B'}$ $\overline{AC} = \overline{A'C'}$ $$\overline{AB} = \overline{A'B'}$$

$$\overline{AC} < \overline{A'C'}$$

FUEL INJECTION VALVE

BACKGROUND OF THE INVENTION

1. Field of the Invention

The present invention relates to a fuel injection valve for injecting fuel by turning the flow of fuel in valve body to swirling flow.

2. Description of the Prior Art

In recent years, engines of intra-cylinder (direct injection) type are used in practical application, which inject fuel directly into engine cylinder in order to reduce fuel cost, to attain low emission and to provide higher output. In the fuel injection valve used in the engine of intra-cylinder injection type, fuel sent from a high pressure fuel pump is spirally fed into fuel injection chamber of semi-spherical shape and it is injected by increasing kinetic energy of the fuel in order to promote atomization of injection fuel.

To further improve atomizing performance of the fuel in this type of fuel injection valve, special notice was taken in JP-A-8-296531 that swirling energy of the fuel in a fuel injection chamber reaches maximum at the center of the bottom surface of the fuel injection chamber, and it was proposed to form an injection nozzle at the center of the bottom surface of the fuel injection chamber and to effectively utilize the swirling energy of the fuel for atomization.

In the fuel injection valve of the above patent application, direction of the injection nozzle formed at the center of the bottom surface of the fuel injection chamber is tilted with respect to axis of the fuel injection chamber to effectively utilize the swirling energy of fuel in the fuel injection chamber and to increase degree of freedom in the direction of the atomized fuel. For this reason, when the swirling flow of fuel in the fuel injection chamber enters inlet of the injection nozzle, flow velocity distribution of the fuel in axial direction of the injection nozzle is deviated. The deviation of flow velocity distribution of fuel is corrected to a certain extent by viscosity of the fuel itself during the course of flow in the injection nozzle, but it cannot be corrected perfectly. Therefore, the fuel is injected through outlet of the injection nozzle while deviation of flow velocity distribution of fuel still remains. This causes unevenness of the atomized fuel and decreases combustibility.

Specifically, atomized fuel is formed not in conical shape but in a shape of a cone obliquely cut. When atomized fuel is formed in such shape, on a portion where flow velocity of atomized fuel is slow, the atomized fuel does not reach near an ignition plug after injection and before ignition of the ignition plug, and it is not possible to collect air-fuel mixture with a concentration high enough compared with the surrounding atmosphere near the ignition plug in the combustion chamber at the time of ignition, and this hinders reduction of fuel cost.

SUMMARY OF THE INVENTION

To solve the above problems, it is an object of the present invention to provide a fuel injection valve, which can ensure more even atomizing of fuel.

To attain the above object, the fuel injection valve according to claim 1 of the present invention comprises deviation reducing means for reducing deviation of flow velocity distribution in axial direction of the injection nozzle (hereinafter referred as "axial flow velocity distribution") of the fuel entering the injection nozzle. This makes it possible to equalize the axial flow velocity distribution of fuel in the injection nozzle and to provide even atomizing of the fuel injected from the outlet of the injection nozzle. As a result, atomized fuel is formed in conical shape, and more atomized fuel can reach around ignition plug. In so doing, it is possible to supply air-fuel mixture with higher concentration than that of the surrounding atmosphere near the ignition plug, and it contributes to the reduction of fuel cost.

In this case, as described in claim 2 of the present invention, if the deviation reducing means is designed in such manner that tilting of an inclined surface from the fuel injection chamber to the injection nozzle is set to a different tilting depending upon a peripheral position of an inlet opening of the injection nozzle the deviation of axial flow velocity distribution of the fuel entering the injection nozzle may be reduced. Specifically, if tilting of the inclined surface from the fuel injection chamber to the injection nozzle is made steeper, it is possible to increase flow velocity in axial direction of the fuel on that portion. On the contrary, if tilting of the inclined surface from the fuel injection chamber to the injection nozzle is made more gentle, it is possible to slow down the flow velocity in axial direction of the fuel on that portion. Therefore, by adequately setting the tilting of the inclined surface from the fuel injection chamber to the injection nozzle depending upon the deviation of the axial flow velocity distribution, it is possible to simply reduce deviation of axial flow velocity distribution of the fuel entering the injection nozzle without providing other components.

Further, as described in claim 3 of the present invention, the deviation reducing means may be designed in such manner that position of the injection nozzle is deviated from the center of the bottom surface of the fuel injection chamber, and tilting of the inclined surface from the fuel injection chamber to the injection nozzle may be set to a different tilting depending upon a peripheral position of an inlet opening of the injection nozzle. In so doing, without designing the inner peripheral surface of the fuel injection chamber in a specific form, it is possible to reduce deviation of the axial flow velocity distribution of the fuel entering the injection nozzle by simply deviating the position of the injection nozzle from the center of the bottom surface of the fuel injection chamber, and this facilitates the manufacture of the valve body.

In case the inner bottom surface of the fuel injection chamber is designed in semi-spherical form and the injection nozzle is formed at the center of the bottom surface, in the axial flow velocity distribution of the fuel flowing through the injection nozzle, the flow velocity reaches minimum in a direction rotated by 90° from tilting direction of the injection nozzle toward swirling direction of fuel, and flow velocity reaches maximum in a direction rotated by 270°. The reasons for this will be described below.

As shown in FIG. 3, if it is supposed, in an XYZ coordinate system based on axis of the fuel injection chamber, that an X-direction component of the swirling flow of fuel is u, a Y-direction component is v, a Z-direction component is w, and a rotation angle in swirling direction of fuel is θ (tilting direction of the injection nozzle: θ=0°), then the flow velocity of the swirling flow of the fuel in the XYZ coordinate system is expressed by the equation (1) as given below:

$$\begin{pmatrix} u \\ v \\ w \end{pmatrix} = \begin{pmatrix} -r \cdot \sin\theta \\ r \cdot \cos\theta \\ w \end{pmatrix} \quad (1)$$

If it is supposed, in an X'Y'Z' coordinate system based on axis of the injection nozzle, that an X'-direction component of the swirling flow of fuel is u', a Y'-direction component is v', a Z'-direction component (axial direction) is w', and a tilt angle of the injection nozzle is α, then the flow velocity of the swirling flow of fuel in the X'Y'Z' coordinate system is given by the following equation (2):

$$\begin{pmatrix} u' \\ v' \\ w' \end{pmatrix} = \begin{pmatrix} \cos\alpha & 0 & -\sin\alpha \\ 0 & 1 & 0 \\ \sin\alpha & 0 & \cos\alpha \end{pmatrix} \begin{pmatrix} u \\ v \\ w \end{pmatrix} \quad (2)$$

$$= \begin{pmatrix} \cos\alpha & 0 & -\sin\alpha \\ 0 & 1 & 0 \\ \sin\alpha & 0 & \cos\alpha \end{pmatrix} \begin{pmatrix} -r \cdot \sin\theta \\ r \cdot \cos\theta \\ w \end{pmatrix}$$

From the above equations (1) and (2), the flow velocity component w' in z' direction (axial direction) is obtained as follows:

$$w' = -r \cdot \sin\alpha \cdot \sin\theta + w \cdot \cos\alpha \quad (3)$$

As it is evident from the equation (3), the axial flow velocity w' reaches minimum when θ=90° and reaches maximum when θ=270°.

To reduce deviation of the axial flow velocity distribution, the position of the injection nozzle should be deviated in a direction of θ=90° with respect to the center of the bottom surface of the fuel injection chamber as described in claim 4 of the invention. In so doing, it is possible to make the tilting of the inclined surface from the fuel injection chamber to the injection nozzle steeper as it approaches to θ=90° and to increase axial flow velocity component of the fuel flowing into the injection nozzle even when inner peripheral surface of the fuel injection chamber is not designed in a specific form. It is also possible to make the tilting of the inclined surface from the fuel injection chamber to the injection nozzle more gentle as it approaches to the opposite side, i.e. θ=270°, and to slow down axial flow velocity component of the fuel flowing into the injection nozzle. As a result, deviation of the axial flow velocity distribution can be reliably reduced.

Further, it is preferable that total periphery of the inlet of the injection nozzle is designed in R-shape (arcuate curved surface). Then, separation of the flow of the fuel flowing into the inlet of the injection nozzle from the fuel injection chamber is prevented, and the fuel smoothly flows into the injection nozzle.

BRIEF DESCRIPTION OF THE DRAWINGS

The object and the features of the present invention will become more apparent from the following description on embodiments explained in connection with the attached drawings.

DETAILED DESCRIPTION OF THE INVENTION

Figure 1A:
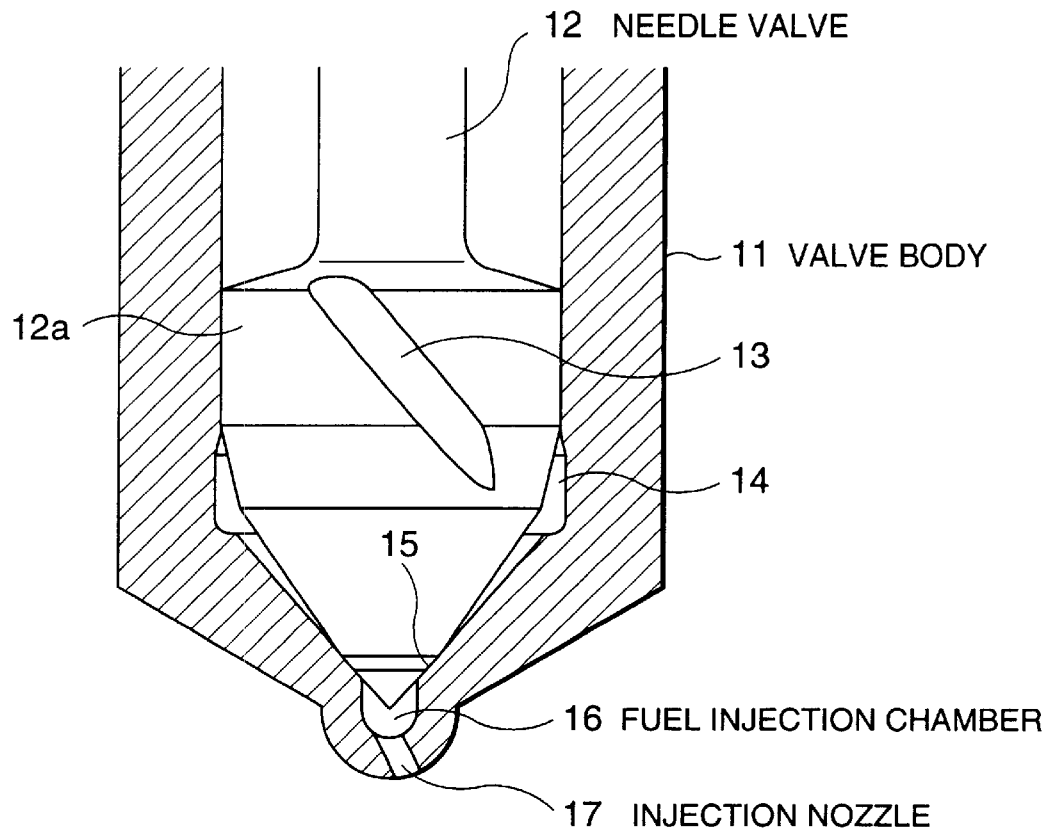
FIG. 1A is a longitudinal sectional view of an atomizing unit of a fuel injection valve in a first embodiment of the present invention.

In the following, description will be given on a first embodiment of the present invention referring to FIG. 1A to FIG. 3. As shown in FIG. 1A, in a hollow valve body 11, a needle valve 12 to be opened or closed by a solenoid (not shown) is accommodated. A large diameter portion 12a formed under the needle valve 12 is slidably engaged in the valve body 11, and a fuel introducing channel 13 is formed obliquely on outer periphery of the large diameter portion 12a. When the fuel sent to the valve body 11 from a high pressure fuel pump (not shown) passes through the fuel introducing channel 13 obliquely arranged, flow of the fuel is turned to swirling flow. An outlet at lower end of the fuel introducing channel 13 is communicated with a swirl chamber 14 which is formed on inner periphery on the lower portion of the valve body 11, and the fuel passing through the fuel introducing channel 13 is turned to swirling flow in the swirl chamber 14. The portion of the valve body 11 lower than the swirl chamber 14 is designed in tapered shape. At its lower end, a valve seat 15 in form of tapered ring is provided. Under the valve seat 15, a fuel injection chamber 16 is formed, which is opened or closed when the needle valve 12 is moved up or down. When the needle valve 12 is opened, the swirling flow in the swirl chamber 14 is spirally sent into the fuel injection chamber 16.

Figure 2:
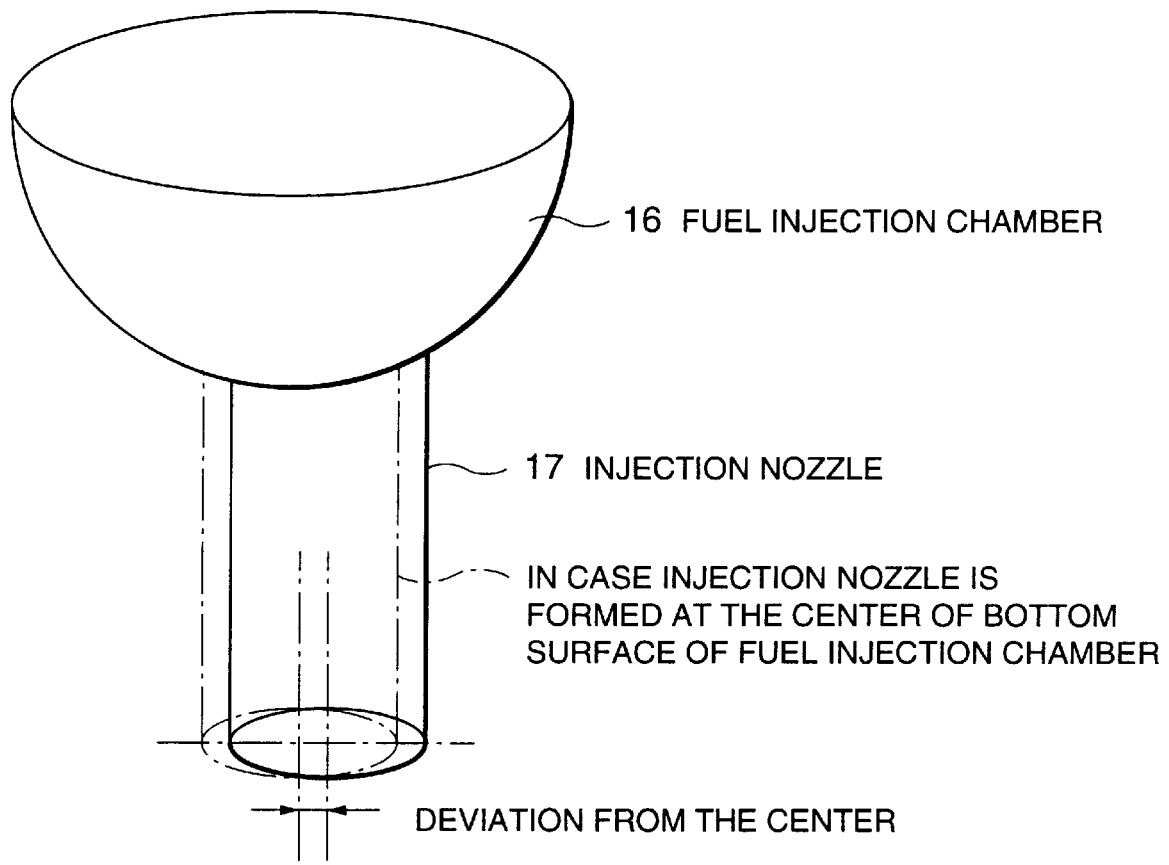
FIG. 2 is a perspective view schematically showing positional relation between a fuel injection chamber and an injection nozzle.

As shown in FIG. 2, inner bottom surface of the fuel injection chamber 16 is designed in semi-spherical shape, and an injection nozzle 17 is formed obliquely on the bottom surface. Tilt angle of this injection nozzle 17 is set, for example, to 20° with respect to axis of the valve body 11 (axis of the fuel injection chamber 16). In order to reduce deviation of flow velocity distribution in axial direction of the fuel injection nozzle 17 (hereinafter referred as "axial flow velocity distribution"), position of the injection nozzle 17 is slightly deviated from the center of the bottom surface of the fuel injection chamber 16. The direction of deviation is a direction rotated by 90° from tilting direction of the injection nozzle 17 toward swirling direction of the fuel with respect to the center of the bottom surface of the fuel injection chamber 16. The amount of deviation of the injection nozzle 17 may be set in such manner that no step is formed on a connection between inner peripheral surface of the fuel injection chamber 16 and the inlet of the injection nozzle 17. It may be deviated, for example, by about 60 to 110 μm from the center of the bottom surface of the fuel injection chamber 16. Further, total periphery of the inlet of the injection nozzle 17 is formed in R-shape (in arcuate curve), and the inner peripheral surface of the fuel injection chamber 16 is connected with the inlet of the injection nozzle 17 as a continuous smooth curved surface.

Figure 3:
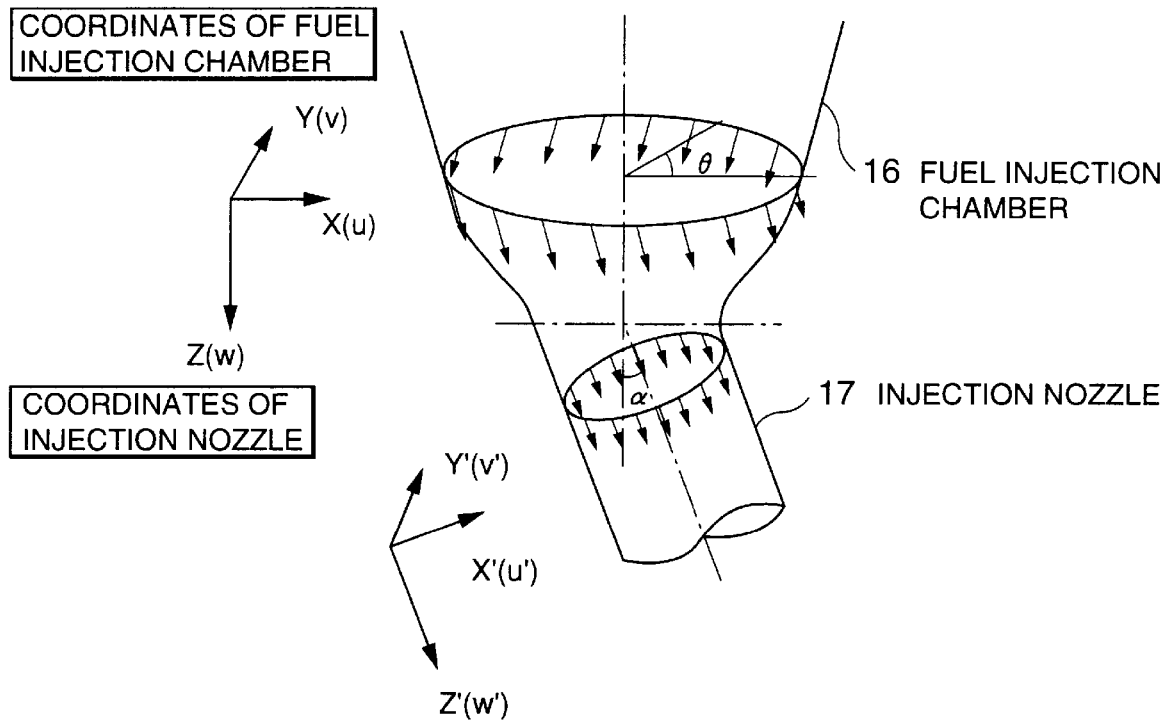
FIG. 3 is a drawing to explain distribution of flow velocity of fuel in axial direction when fuel enters the injection nozzle from the fuel injection chamber.

When the injection nozzle is formed at the center of the bottom surface of the fuel injection chamber, deviation occurs in axial flow velocity distribution of fuel as described above. When rotation angle in the swirling direction of the fuel is set to θ as shown in FIG. 3 (tilting direction of injection nozzle: θ=0°), axial flow velocity is θ=90° and reaches minimum when θ=90° and reaches maximum when θ=270°.

Figure 1B:
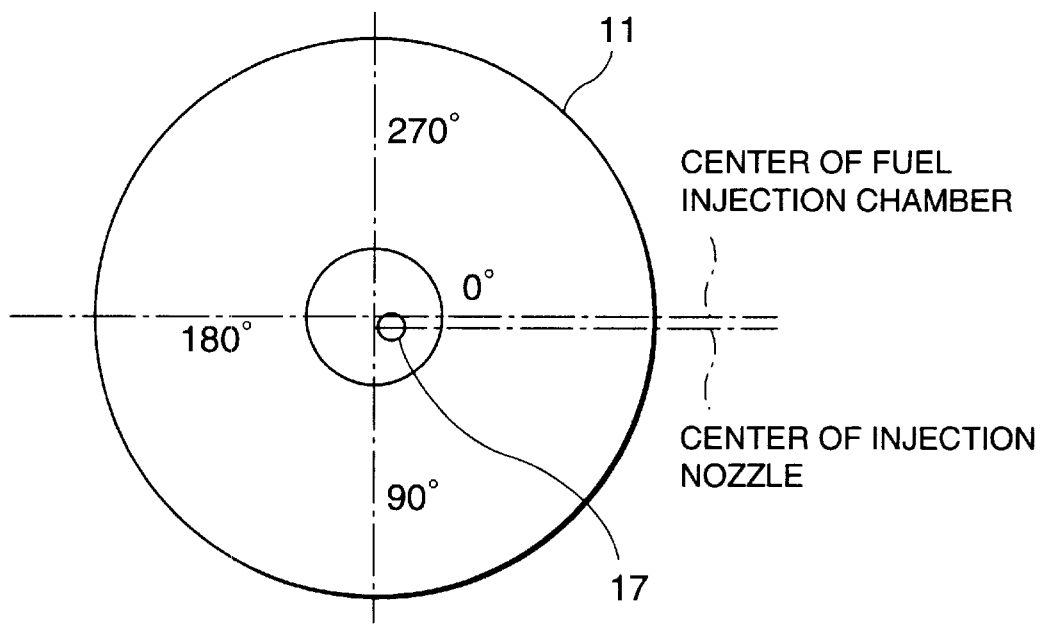
FIG. 1B is a bottom view of the same.

As the means to reduce the deviation of axial flow velocity distribution, in the first embodiment, the position of the injection nozzle 17 is deviated in a direction of θ=90° with respect to the center of the bottom surface of the fuel injection chamber 16 as shown in the bottom view of FIG. 1B. As a result, the more it approaches to θ=90°, the steeper the inclined surface from the fuel injection chamber 16 to the injection nozzle 17 is tilted, and it is possible to increase axial flow velocity component of the fuel entering the injection nozzle 17. The more it approaches to the opposite side, i.e. θ=270°, the more gentle the inclined surface from the fuel injection chamber 16 to the injection nozzle 17 is tilted, and axial flow velocity component of the fuel entering the injection nozzle 17 can be slowed down. This makes it possible to reliably reduce deviation of the axial flow velocity distribution. As a result, it is possible to equalize axial flow velocity distribution of the fuel injected from the outlet of the injection nozzle 17, to provide even atomizing of fuel, to improve combustibility, and to increase effects such as low fuel cost, low emission and higher output.

Moreover, in the first embodiment, total periphery of the inlet of the injection nozzle 17 is designed in R-shape, and inner peripheral surface of the fuel injection chamber 16 is connected with the inlet of the injection nozzle 17 as continuous smooth curved surface. As a result, separation of flow of the fuel entering the inlet of the injection nozzle 17 from the fuel injection chamber 16 can be prevented, and the fuel can be smoothly sent into the injection nozzle 17, and atomizing performance can be improved.

In the first embodiment, to reduce deviation of the axial flow velocity distribution, position of the injection nozzle 17 is deviated in a direction of θ=90° with respect to the center of the bottom surface of the fuel injection chamber 16. However, the direction of deviation is not limited to the direction of θ=90°, and an effect to reduce deviation of the axial flow velocity distribution can be obtained if it is deviated in a direction closer to 90°.

Figure 4A:
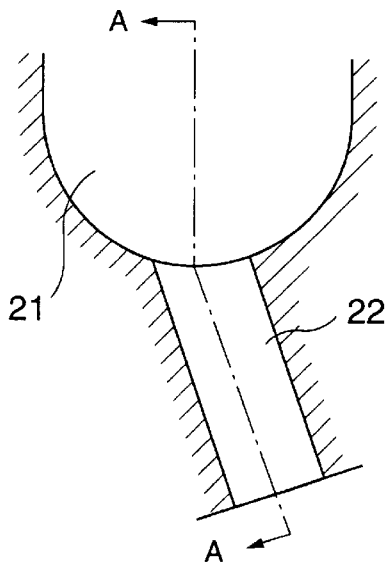
FIG. 4A is a longitudinal sectional view of the fuel injection chamber and the injection nozzle in a second embodiment of the invention.
Figure 4B:
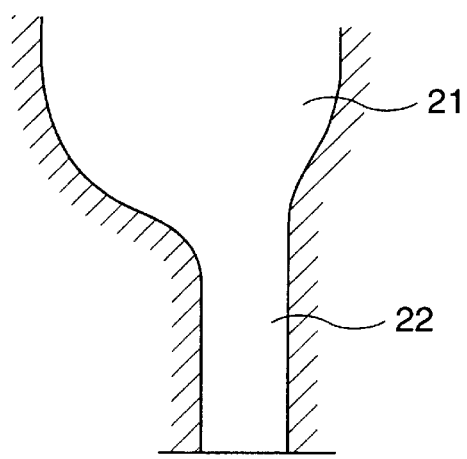
FIG. 4B is a sectional view along the line A—A in FIG. 4A.

Also, the means for reducing deviation of the axial flow velocity distribution is not limited to the deviation of the position of the injection nozzle. As seen in a second embodiment shown in FIG. 4B, tilting of the inclined surface from the fuel injection chamber 21 to the injection nozzle 22 may be set to a different tilting depending upon a peripheral position of an inlet opening of the injection nozzle 22. That is, if the inclined surface from the fuel injection chamber 21 to the injection nozzle 22 is tilted steeper, it is possible to increase flow velocity of the fuel in axial direction on that portion. On the contrary, if the inclined surface from the fuel injection chamber 21 to the injection nozzle 22 is tilted more gentle, it is possible to slow down flow velocity of the fuel in axial direction on that portion. Therefore, by adequately tilting the inclined surface from the fuel injection chamber 21 to the injection nozzle 22 depending upon deviation of the axial flow velocity distribution, it is possible to reduce deviation of axial flow velocity distribution of the fuel entering the injection nozzle 22 without providing other components, and atomizing condition of the fuel injected from the outlet of the injection nozzle 17 can be equalized.

Figure 5A:
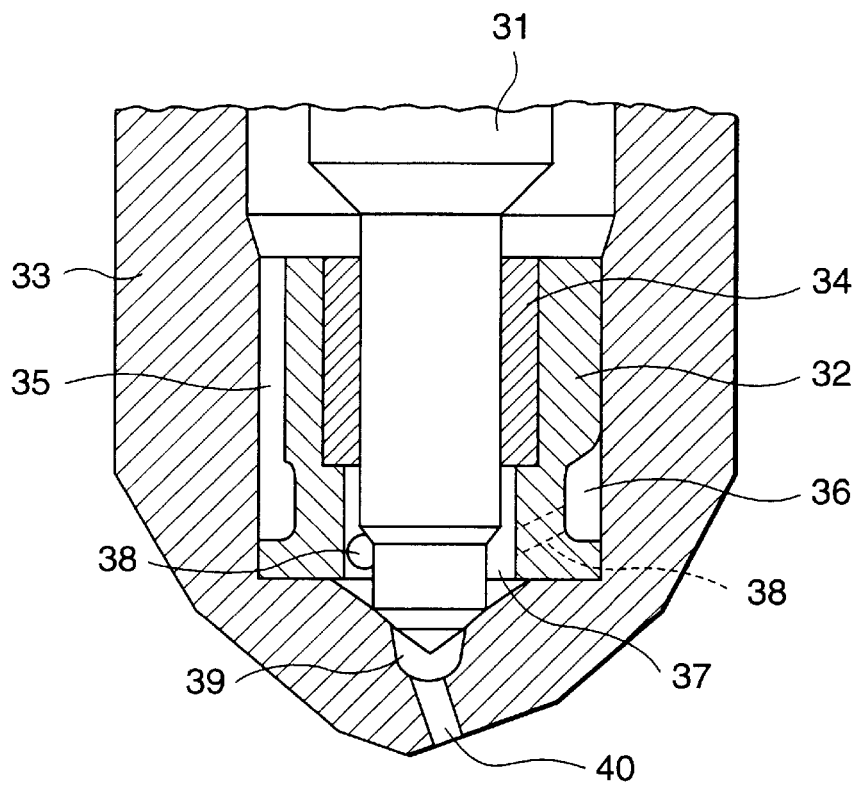
FIG. 5A is a longitudinal sectional view of an atomizing unit of a fuel injection valve in a third embodiment of the invention.
Figure 5B:
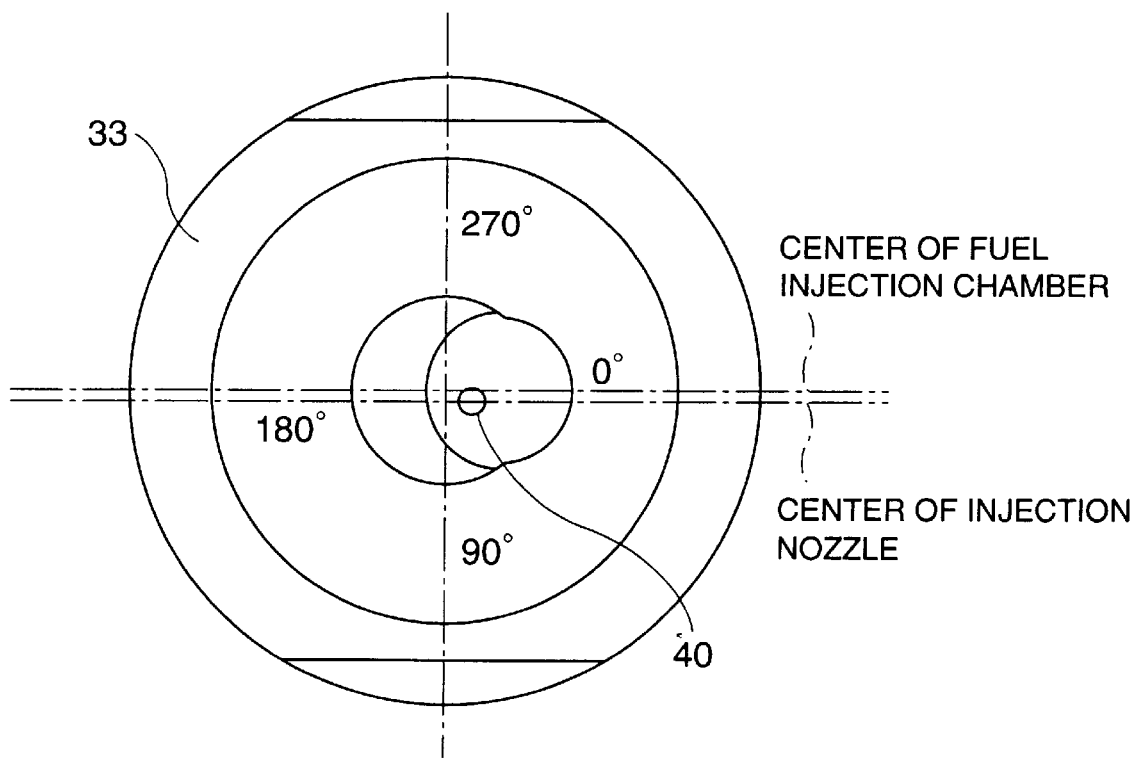
FIG. 5B is a bottom view of the same.

In the fuel injection valve shown in FIG. 1A and FIG. 1B, the fuel introducing channel 13 is obliquely provided on outer peripheral surface of the needle valve 12 to generate swirling flow. In a third embodiment shown in FIG. 5A and FIG. 5B, a swirler 32 made of a material different from that of the needle valve 31 is used to generate the swirling flow. In this fuel injection valve, the swirler 32 in cylindrical shape is forcibly placed and fixed at lower portion of the valve body 33, and a cylindrical sliding member 34 is placed and fixed in inner portion of the swirler 32, and the needle valve 31 is placed into inner portion of the sliding member 34 so that the needle valve can be slidably moved up and down.

On the other hand, on outer periphery of the swirler 32, a fuel introducing channel 35 for sending the fuel downward is provided. The lower end of this fuel introducing channel 35 is connected with an annular channel 36 surrounding total outer periphery of the swirler 32, and a swirl hole 38 to introduce the fuel from the annular channel 36 to a swirl chamber 37 formed on lower inner periphery of the swirler 32 is provided in such manner that it is extended in tangential direction to the swirl chamber 37. The fuel introduced through the fuel introducing channel 35 enters the swirl chamber 37 from annular channel 36 through the swirl hole 38, and swirling flow is generated around the needle valve 31 in the swirl chamber 37.

Also, in the third embodiment, the fuel injection chamber 39 and the injection nozzle 40 at lower end of the valve body 33 are designed in the same structure as in the first embodiment. Specifically, inner bottom surface of the fuel injection chamber 39 is formed in semi-spherical shape, and an injection nozzle 40 is provided obliquely on the bottom surface. The position of the injection nozzle 40 is deviated in a direction of θ=90° from the center of the bottom surface of the fuel injection chamber 39, and the amount of deviation is set in such range that no step is formed on a connection between the inner peripheral surface of the fuel injection chamber 39 and the inlet of the injection nozzle 40. Further, total periphery of the inlet of the injection nozzle 40 is formed in R-shape (arcuate curved surface), and inner peripheral surface of the fuel injection chamber 39 is connected with the inlet of the injection nozzle 40 as a continuous smooth curved surface.

In the third embodiment as described above, exactly the same effect as in the first embodiment can be attained.

Figure 6:
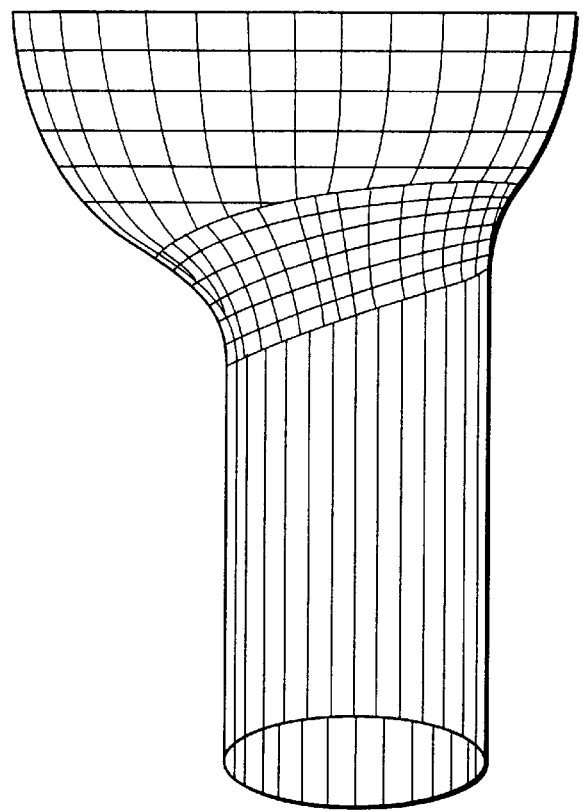
FIG. 6 is a 3-dimensional schematical drawing to show shape of the fuel injection valve of the present invention near the injection nozzle.
Figure 7:
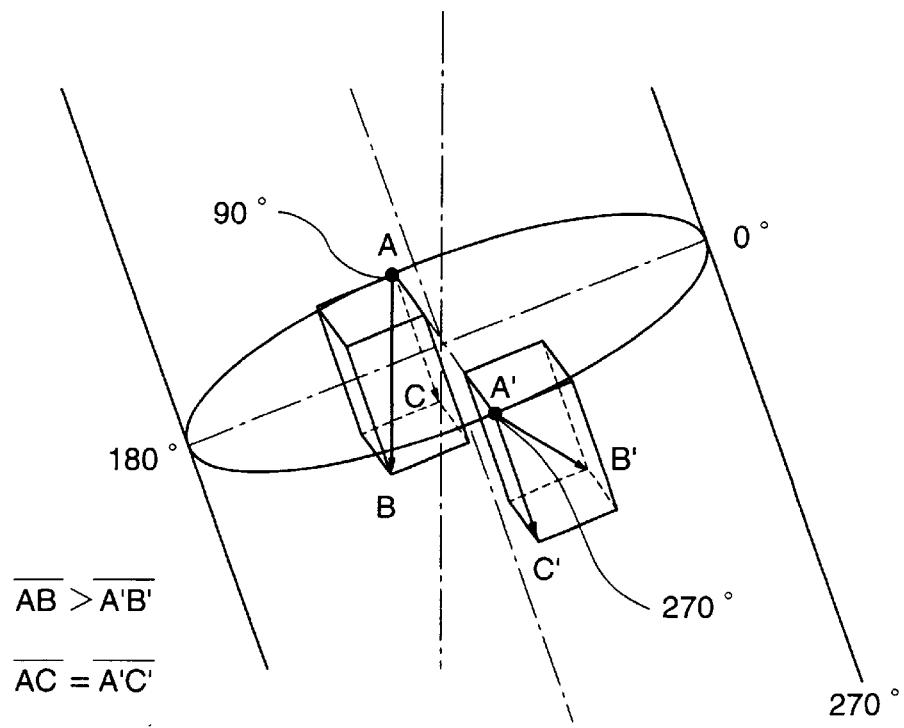
FIG. 7 shows operation of the fuel injection valve of FIG. 6.
Figure 8:
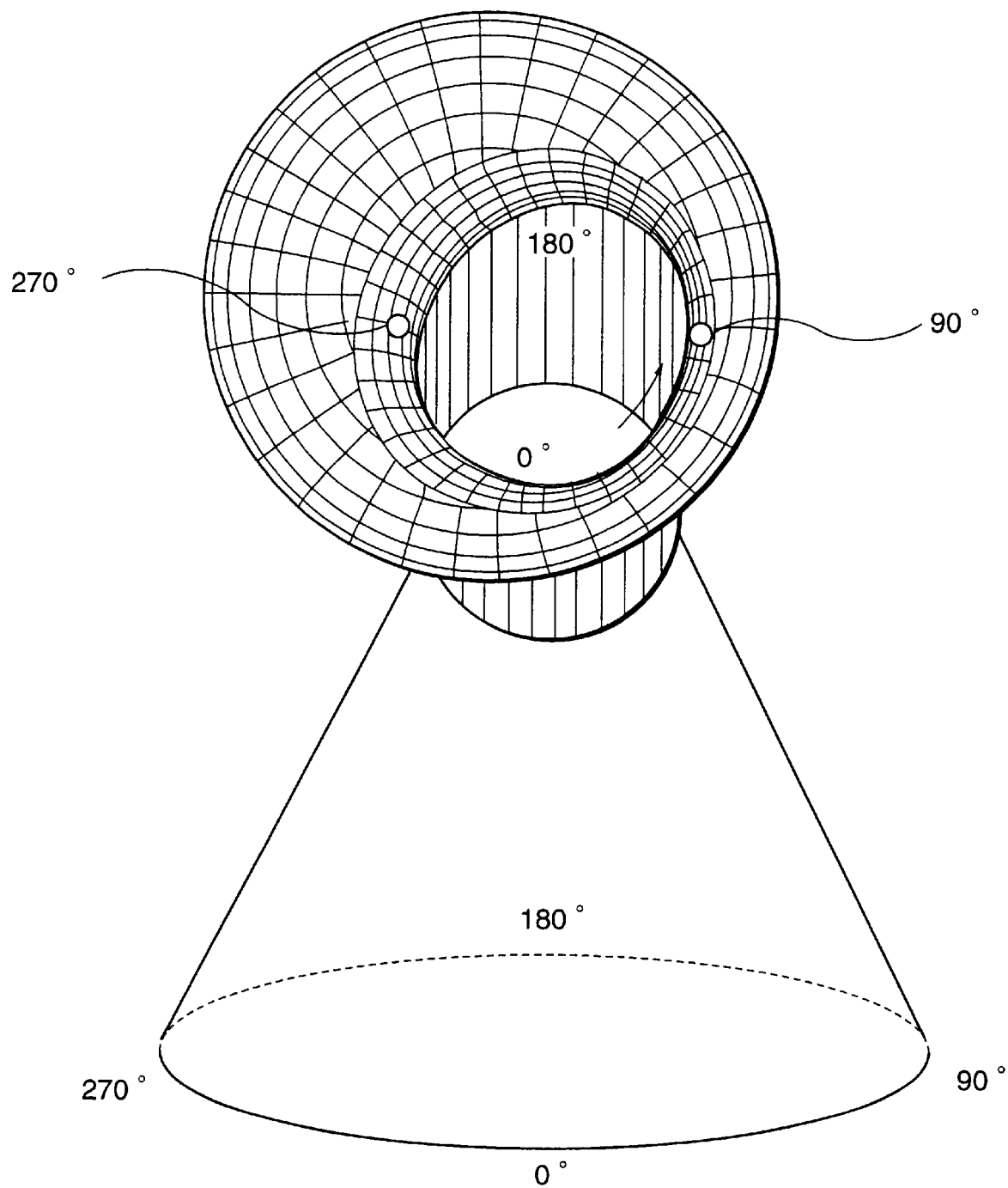
FIG. 8 is a 3-dimensional schematical drawing to show the arrangement of FIG. 6 as seen obliquely from above, and also to show an aspect of the injection.
Figure 10:
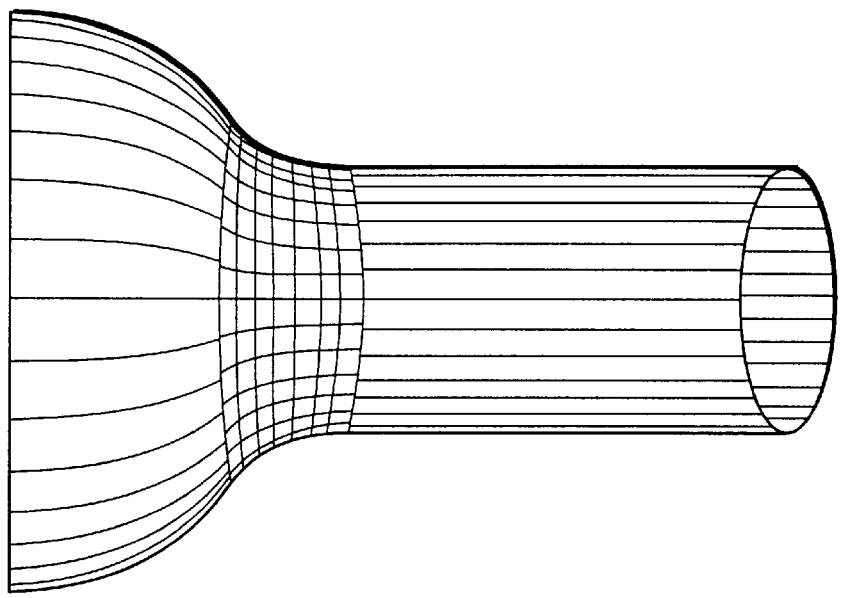
FIG. 10 is a 3-dimensional schematical drawing to represent a portion near the injection nozzle of the valve shown in FIG. 9.
Figure 9:
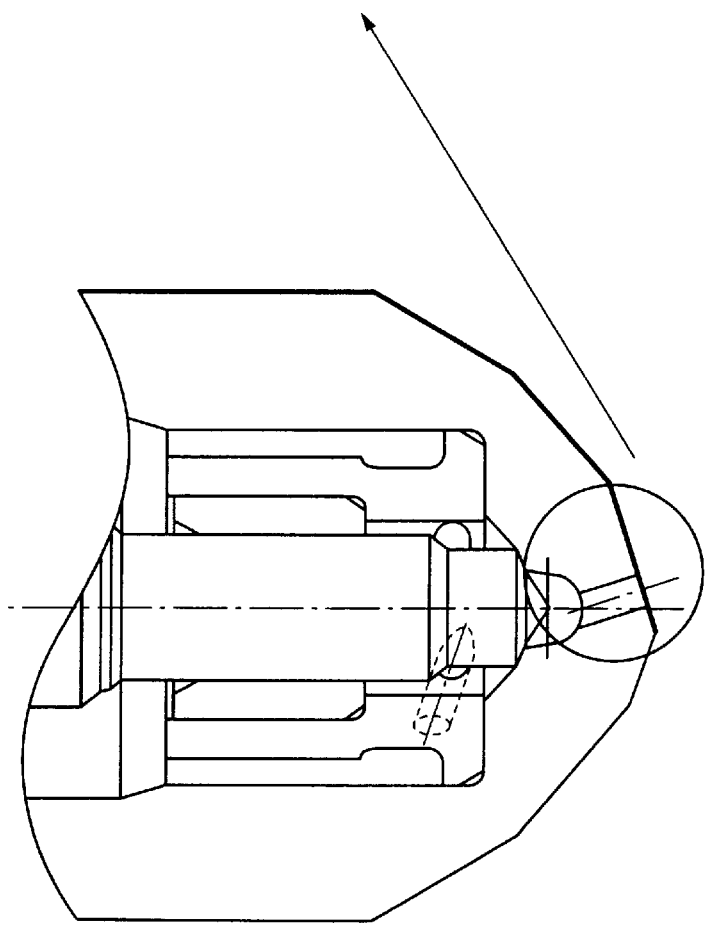
FIG. 9 represents an arrangement of a conventional type fuel injection valve.
Figure 11:
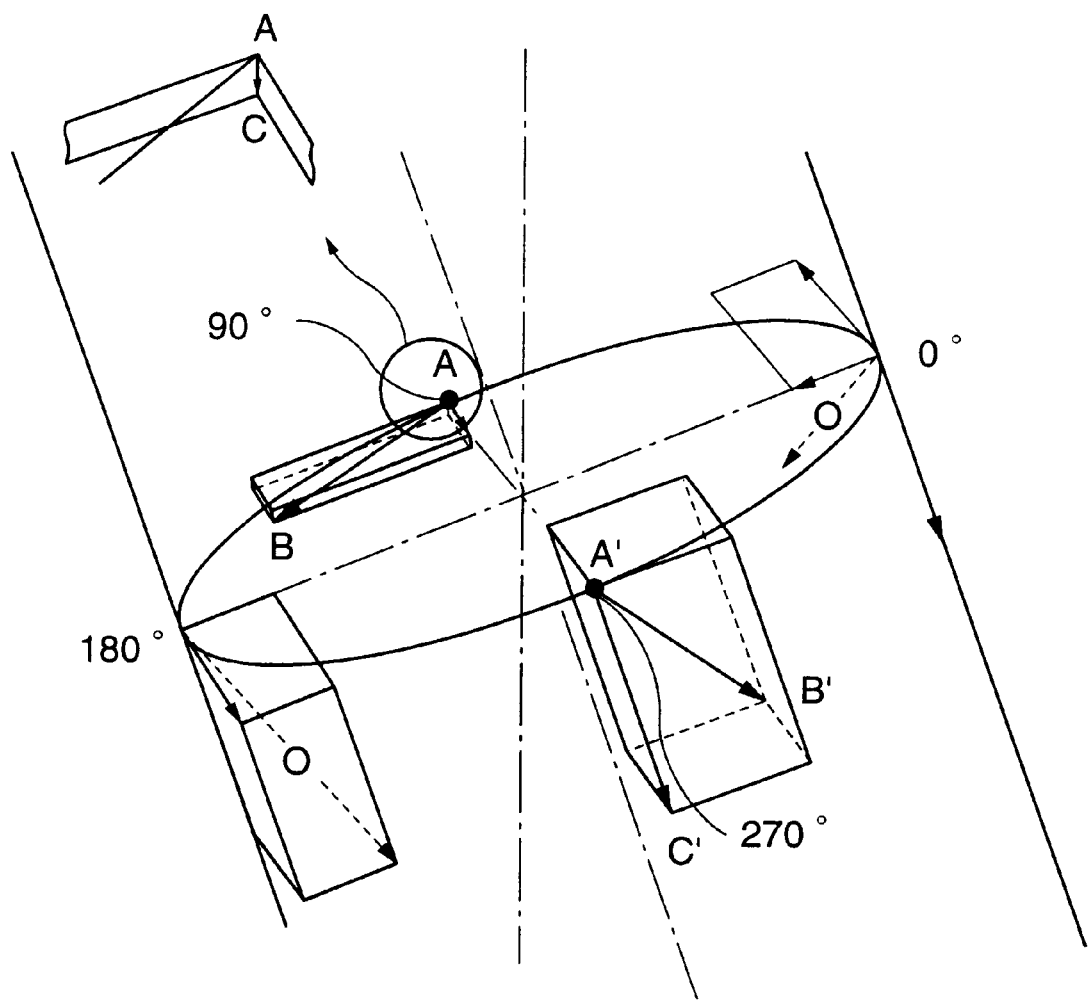
FIG. 11 represents operation of the fuel injection valve shown in FIGS. 9 and FIG. 10.
Figure 12:
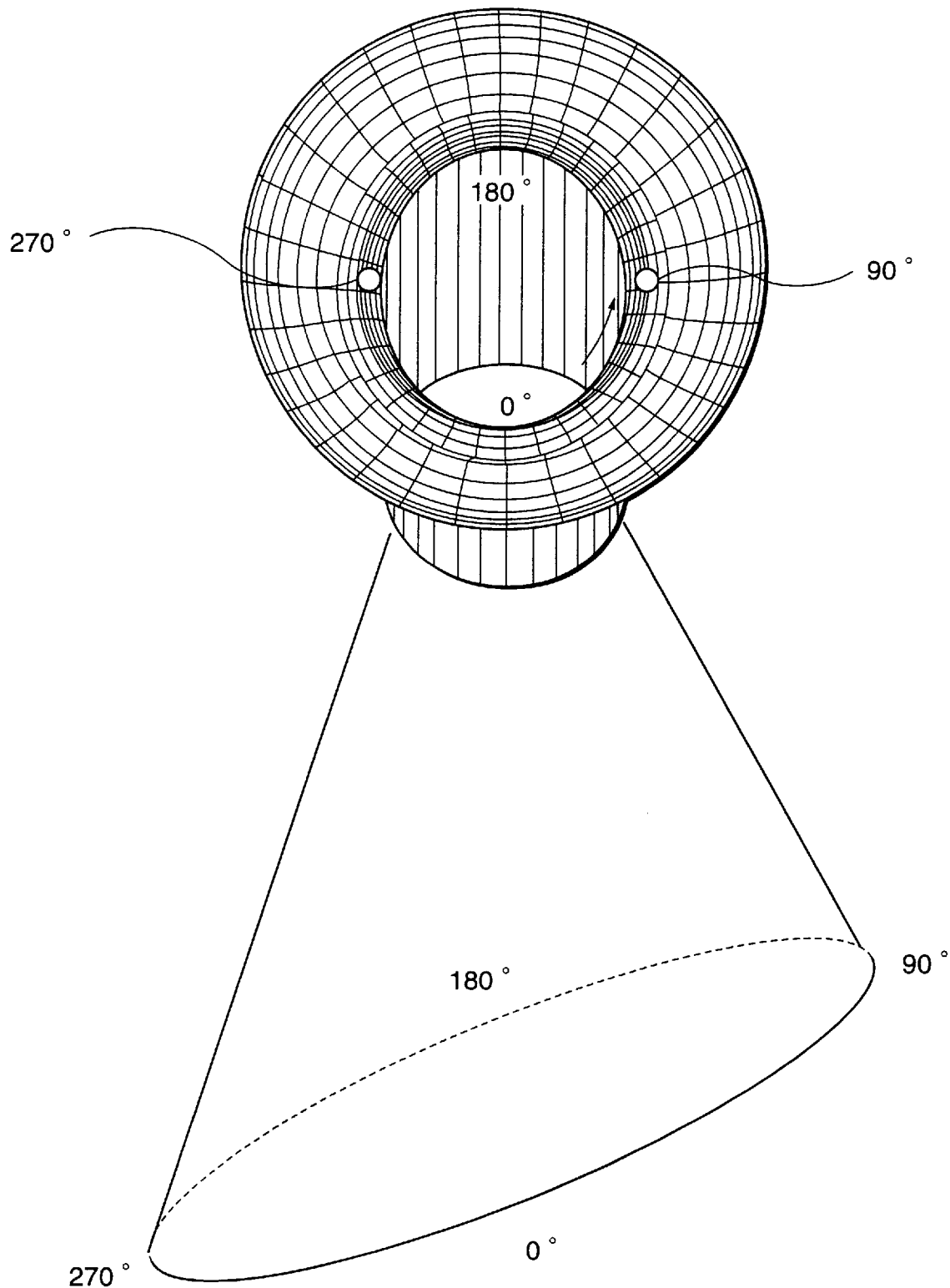
FIG. 12 is a three dimensional schematical drawing to show the arrangement of FIG. 10 as seen obliquely from above and also to show an aspect of the injection.

Here, the effect of equalization of injecting condition of the fuel in the present invention is comparatively assessed with the arrangement of the conventional example. FIG. 9 shows an arrangement of a conventional type fuel injection valve. FIG. 10 is a 3-dimensional schematical drawing to show a portion near the injection nozzle shown in FIG. 9, and FIG. 11 shows operation of the fuel injection valve of FIG. 9 and FIG. 10, and FIG. 12 is a 3-dimensional schematical drawing to show an arrangement of FIG. 10 as seen obliquely from above and also to show an aspect of the injection. FIG. 6 is a 3-dimensional schematical drawing of a portion near the injection nozzle of the fuel injection valve according to the present invention, and FIG. 7 shows operation of the fuel injection valve of FIG. 6. FIG. 8 is a 3-dimensional drawing of the arrangement of FIG. 6 as seen obliquely from above and also shows an aspect of the injection.

FIG. 7 and FIG. 11 each represents fuel injecting direction and flow velocity of fuel as vectors at a position rotated by 90° from tilting direction of the injection nozzle in swirling direction of the fuel and at a position rotated by 270°. In each of these figures, vectors AB and A'B' are vectors in a direction along axis of the swirling flow, and vectors AC and A'C' represent actual injecting direction and flow velocity. In FIG. 11, a portion of the vector AC is shown enlarged in the figure. As it is evident from the comparison of FIG. 11 with FIG. 7, there is difference in size between the vector AC and the vector A'C' in the conventional arrangement, whereas, in the arrangement of the present invention, the vector AC and the vector A'C' are equal to each other in size, and it is evident that even or equalized injecting condition can be achieved according to the present invention. This condition can also be clearly understood from the comparison of FIG. 12 with FIG. 8. Specifically, a portion in horn-like shape or truncated cone in the lower portion of each of FIG. 12 and FIG. 8 represents injecting direction and flow velocity of fuel. Length in longitudinal direction corresponds to flow velocity. That is, in FIG. 12 showing operation in the conventional arrangement, flow velocity is higher in case of 270° than in case of 90°. In the present invention, it is equal as shown in FIG. 8.

The fuel injection valve given in the above embodiments is not limited to the fuel injection valve for an intra-cylinder type injection engine, and it can also be used as a fuel injection valve to inject fuel to an intake manifold of each cylinder of an engine.

What is claimed is:

1. A fuel injection valve, comprising:

a valve body;

a needle valve accommodated within said valve body;

a fuel injection chamber to be opened or closed by reciprocal movement of said needle valve formed on a tip of said valve body; and an injection nozzle formed at a bottom of said fuel injection chamber obliquely to a direction of said reciprocal movement of said needle valve wherein fuel sent into said valve body when said needle valve is opened is spirally fed into said fuel injection chamber, and fuel is injected from said injection nozzle, and wherein said injection nozzle is provided with a means for reducing a deviation of a flow velocity distribution, in an axial direction of said injection nozzle, of the fuel entering said injection nozzle.

wherein an inclined surface from said fuel injection chamber to said injection nozzle has a slope which is set according to a peripheral position of an inlet opening of said injection nozzle, whereby the deviation of the flow velocity distribution in said axial direction of said injection nozzle of the fuel entering said injection nozzle is reduced, said means for reducing a deviation of a flow velocity distribution having an arrangement such that the inclined surface between said fuel injection chamber and said fuel injection nozzle differs at two positions determined by a plane which includes a line normal to both an axis of said injection nozzle and an axis of said fuel injection and which intersects a circumference of said inlet opening of said injection nozzle, said plane passing through a center of said inlet opening of said fuel injection nozzle and chamber.

2. A fuel injection valve, comprising:

a valve body;

a needle valve accommodated within said valve body; and a fuel injection chamber to be opened or closed by reciprocal movement of said needle valve formed on a tip of said valve body;

an injection nozzle formed at a bottom surface of said fuel injection chamber obliquely to the direction of the reciprocal movement of said needle valve, wherein fuel introduced into said valve body when said needle valve is opened is spirally fed into said fuel injection chamber and injected from said injection nozzle, said injection nozzle being provided with a means for reducing a deviation of a flow velocity distribution in an axial direction of said injection nozzle of the fuel entering said injection nozzle, and said deviation reducing means being arranged such that by deviating a position of said injection nozzle from a center of the bottom surface of said fuel injection chamber to a direction normal to a plane including an axis of said fuel injection nozzle and an axis of said fuel injection chamber, a slope of an inclined surface from said fuel injection chamber to said injection nozzle is varied depending upon a peripheral position of an inlet opening of said injection nozzle.

3. A fuel injection valve according to claim 2, wherein inner bottom surface of said fuel injection chamber is designed in semi-spherical form, and said injection nozzle is opened at a position on said inner bottom surface deviated to a direction rotated by 90° from said tilting direction toward swirling direction of the fuel with respect to the center of said inner bottom surface.

4. A fuel injection valve according to any one of claims 1,2 and 3, wherein a total periphery of the inlet opening of said injection nozzle is designed in an R-shaped form.

* * * * *